PATENTED
DEC 3 1867
F. HUOT, IMP IN TREATING PETROLEUM &c
ASSIGNED TO HUOT & ROGERS.
71619
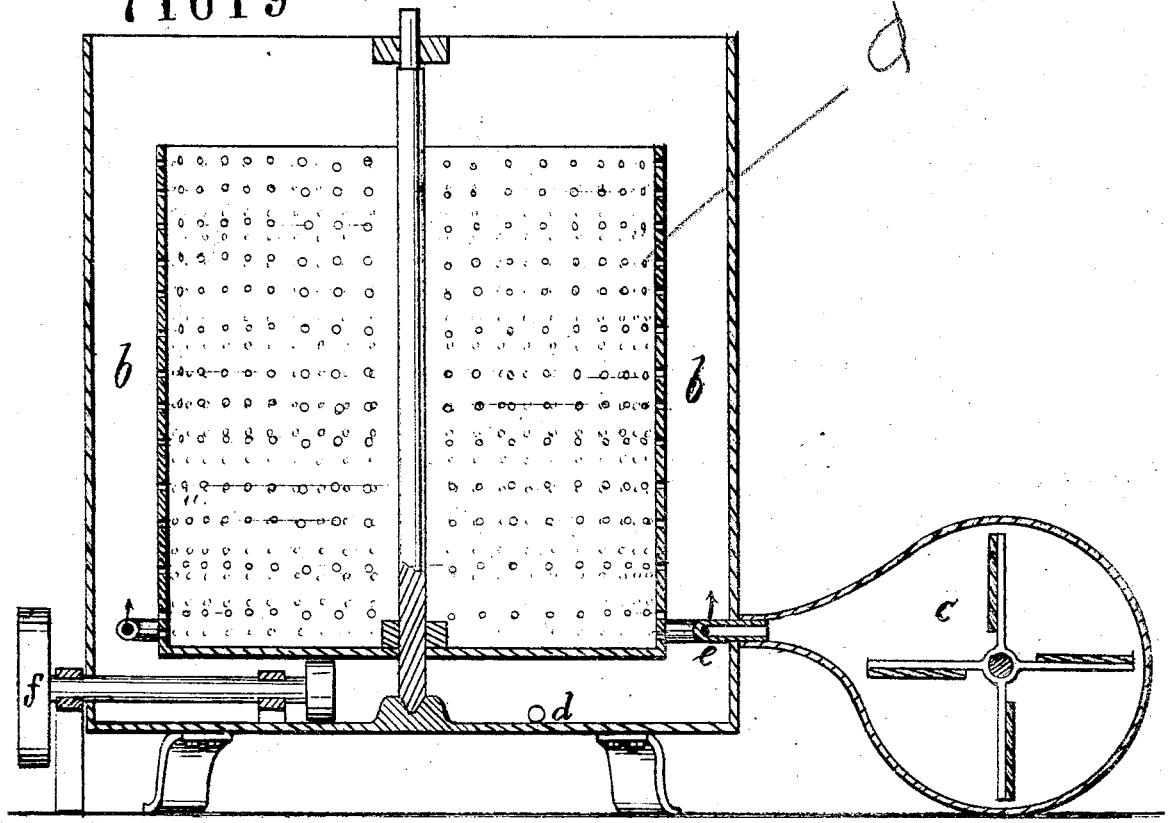

United States Patent Office.

FLEURY HUOT, OF NEW YORK, N. Y., ASSIGNOR TO HIMSELF AND JOHN ROGERS, OF THE SAME PLACE.

*Letters Patent No. 71,619, dated December 3, 1867; antedated November 15, 1867.*

IMPROVED MODE OF TREATING PETROLEUM TO REMOVE THE MORE VOLATILE PORTIONS.

The Schedule referred to in these Letters Patent and making part of the same.

TO ALL WHOM IT MAY CONCERN:

Be it known that I, FLEURY HUOT, of the city and State of New York, have invented, made, and applied to use a certain new and useful Improvement in Treating Petroleum and similar oils; and I do hereby declare the following to be a full, clear, and exact description of the said invention, reference being had to the annexed drawing, making part of this specification, wherein I have shown a vertical section of an apparatus employed by me in the treating of said oils.

The object of my said invention is to remove the light and inflammable portions of the hydrocarbon from petroleum and similar oils, and thereby render such oils safe in use, and prevent the risk of explosions from the vapors arising from such volatile hydrocarbons.

The nature of my said invention consists in subjecting such oils, while in the form of fine spray, to the action of a current of air, which volatilizes such light hydrocarbons, and the oil which remains will stand a higher fire-test than the same oil would before it was subjected to my treatment.

In order to finely comminute the oil, I make use of a suitable perforated apparatus, (I prefer the rotary vessel $a$, revolved rapidly,) into which the petroleum is supplied and is thrown off by the centrifugal force through the finely-perforated cylinder $a$ into the air-space $b$, through which a blast of air is directed from the rotary blower $c$, or otherwise, and passing up through the oil in an atomic state, carries off the gaseous and light inflammable vapors from the oils, so that a higher temperature is required to ignite them. A pipe or cock may be provided at $d$ for the oil passing away from the apparatus.

The air from the blower $c$ will act most efficiently if admitted by a perforated pipe at $e$, to rise through the air-space $b$. The centrifugal separator may be rotated by any suitable means. I have shown a pulley below it for this purpose at $f$. The intensity of the air-blast will depend upon the character of the oil, and in some cases the circulation of the air produced by the revolving vessel $a$ will be sufficient. In cold weather the air may be warmed before it passes into contact with the oil.

What I claim, and desire to secure by Letters Patent, is—

Subjecting petroleum and other oils to the action of air while such oil is in a finely-comminuted or atomic condition, as and for the purposes set forth.

In witness whereof, I have hereunto set my signature, this sixth day of April. A. D. 1867.

FLEURY HUOT.

Witnesses:
CHAS. H. SMITH,
GEO. D. WALKER.